(12) United States Patent
Grushkowitz

(10) Patent No.: US 9,395,104 B2
(45) Date of Patent: Jul. 19, 2016

(54) INTEGRATED TORQUE COUPLING AND MOUNT

(71) Applicant: SunPower Corporation, San Jose, CA (US)

(72) Inventor: Tyler Grushkowitz, Hayward, CA (US)

(73) Assignee: SUNPOWER CORPORATION, San Jose, CA (US)

( * ) Notice: Subject to any disclaimer, the term of this patent is extended or adjusted under 35 U.S.C. 154(b) by 678 days.

(21) Appl. No.: 13/631,782

(22) Filed: Sep. 28, 2012

(65) Prior Publication Data
US 2014/0090637 A1 Apr. 3, 2014

(51) Int. Cl.
| | |
|---|---|
| *F24J 2/54* | (2006.01) |
| *F24J 2/52* | (2006.01) |
| *B23P 11/00* | (2006.01) |
| *F16D 1/02* | (2006.01) |
| *F16D 1/027* | (2006.01) |
| *F16D 1/033* | (2006.01) |
| *F16D 1/068* | (2006.01) |
| *H01L 31/04* | (2014.01) |
| *F24J 2/38* | (2014.01) |

(52) U.S. Cl.
CPC ............. *F24J 2/541* (2013.01); *B23P 11/00* (2013.01); *F16D 1/02* (2013.01); *F16D 1/027* (2013.01); *F16D 1/033* (2013.01); *F16D 1/068* (2013.01); *F24J 2/526* (2013.01); *H02S 10/00* (2013.01); *F24J 2002/5281* (2013.01); *F24J 2002/5468* (2013.01); *Y02E 10/47* (2013.01); *Y02E 10/50* (2013.01); *Y10T 29/49355* (2015.01); *Y10T 403/47* (2015.01); *Y10T 403/64* (2015.01)

(58) Field of Classification Search
CPC ..... F24J 2/523; F24J 2/541; F24J 2002/0046; F24J 2002/5444; F24J 2002/5468
USPC .......................................... 136/244; 126/600
See application file for complete search history.

(56) References Cited

U.S. PATENT DOCUMENTS

| 4,393,559 A * | 7/1983 | Heckethorn et al. ............. 24/277 |
| 6,623,047 B2 * | 9/2003 | Olechnowicz et al. ....... 285/328 |

(Continued)

FOREIGN PATENT DOCUMENTS

| DE | 10258828 A1 * | 7/2004 | ............ F16L 23/036 |
| KR | 10-0772043 | 11/2007 | |

OTHER PUBLICATIONS

International Search Report and Written Opinion of the International Searching Authority in counterpart International Appl. No. PCT/US2012/070635, dated Jun. 27, 2013, in 13 pages.

*Primary Examiner* — Jorge Pereiro
(74) *Attorney, Agent, or Firm* — Knobbe, Martens, Olson & Bear LLP

(57) ABSTRACT

A sun tracking solar energy collection system can include torque tubes formed with a plurality of rotatable shafts connected to each other in an end to end fashion. The ends of the shafts can be connected with coupling devices in the form of an integrated coupling flange and mounting devices. The coupling flange can include a mounting surface that extends generally parallel to the axis of rotation of the shaft. Additionally, the coupling flange can include a coupling face that extends generally perpendicular to the axis of rotation, so as to provide a mating face for an adjacent coupling flange to transmit torque from one shaft to another. The mounting flanges can be used to support devices such as solar energy collection devices including photovoltaic modules or other devices.

20 Claims, 5 Drawing Sheets

(56) References Cited

U.S. PATENT DOCUMENTS

| | | |
|---|---|---|
| 7,587,862 B2 * | 9/2009 | Reynolds et al. .............. 52/81.3 |
| 7,647,924 B2 | 1/2010 | Hayden |
| 7,968,791 B2 * | 6/2011 | Do et al. ....................... 136/246 |
| 8,615,960 B2 * | 12/2013 | Marcotte et al. ............. 52/655.1 |
| 8,863,448 B2 * | 10/2014 | Werner et al. ................. 52/81.3 |
| 8,931,763 B2 * | 1/2015 | Tharp et al. ................. 261/122.1 |
| 2003/0062037 A1 | 4/2003 | Hayden et al. |
| 2008/0072516 A1 * | 3/2008 | Reynolds et al. ............... 52/694 |
| 2008/0127595 A1 * | 6/2008 | Reynolds et al. ............. 52/653.2 |
| 2011/0157733 A1 * | 6/2011 | Werner et al. ................. 359/871 |
| 2011/0226309 A1 * | 9/2011 | Do et al. ....................... 136/246 |
| 2011/0286121 A1 * | 11/2011 | Werner et al. ................. 359/872 |
| 2011/0289750 A1 | 12/2011 | Kats et al. |
| 2011/0315085 A1 * | 12/2011 | Lindgren ....................... 119/203 |
| 2012/0061862 A1 * | 3/2012 | Tharp et al. ................. 261/122.1 |
| 2012/0152311 A1 | 6/2012 | Miller et al. |
| 2012/0180845 A1 * | 7/2012 | Cole et al. ..................... 136/246 |
| 2012/0187058 A1 * | 7/2012 | Almy et al. ................... 211/41.1 |
| 2012/0217209 A1 * | 8/2012 | Marcotte et al. ............. 211/41.1 |
| 2013/0220950 A1 * | 8/2013 | Gilabert ........................ 211/13.1 |
| 2014/0102993 A1 * | 4/2014 | Werner et al. ................ 211/1.51 |
| 2014/0182580 A1 * | 7/2014 | Marcotte et al. .............. 126/696 |
| 2015/0015975 A1 * | 1/2015 | Huss et al. ..................... 359/853 |
| 2015/0027970 A1 * | 1/2015 | Werner et al. ................ 211/41.1 |

* cited by examiner

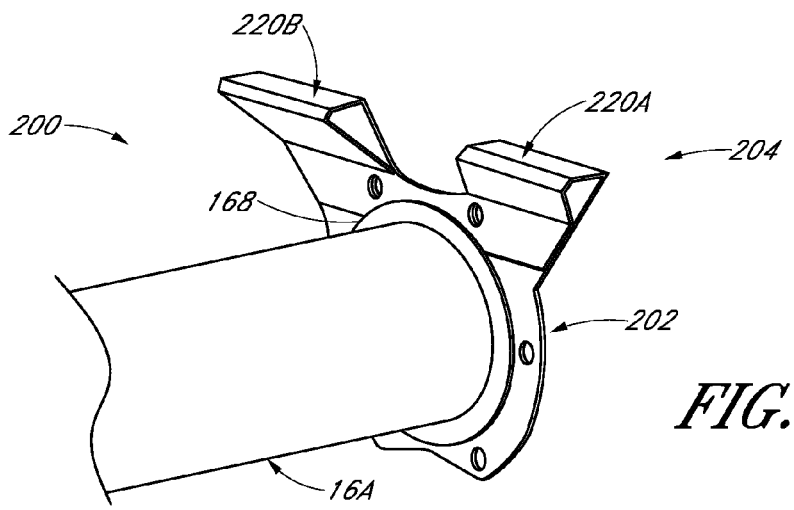
FIG. 6
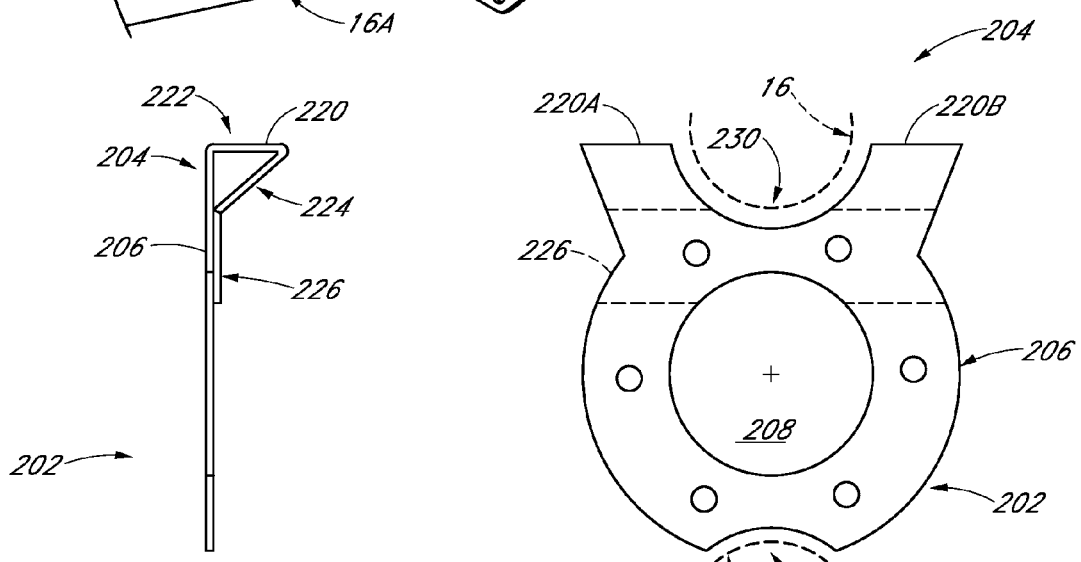
FIG. 7
FIG. 8
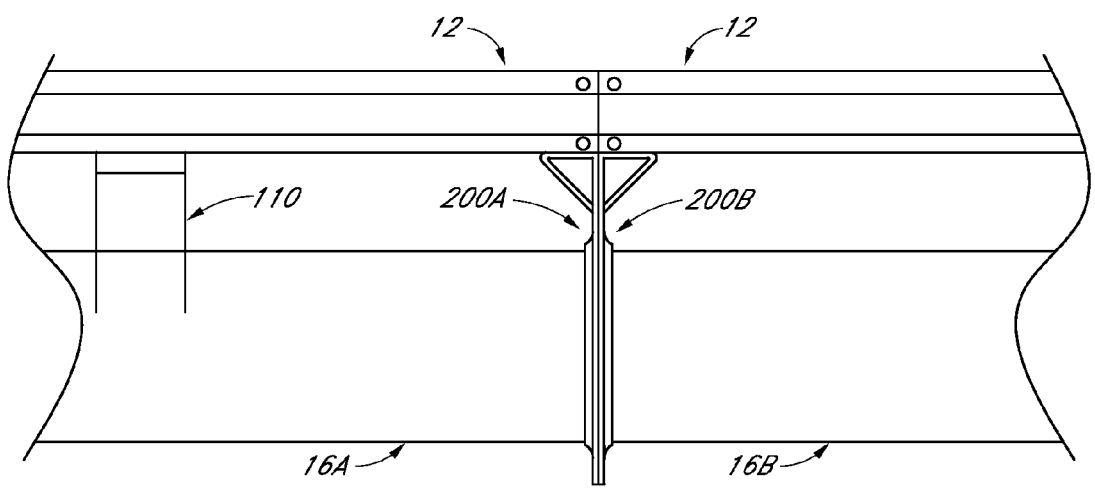
FIG. 9

INTEGRATED TORQUE COUPLING AND MOUNT

BACKGROUND OF THE INVENTIONS

1. Field of the Inventions

The present application is directed to connectors that can be used for various kinds of structures, including rotatable shafts, such as components for connecting shafts together and for mounting other devices to the shafts.

2. Background

Some known sun tracking photovoltaic solar power systems, such as utility-scale, photovoltaic installations, are designed to pivot a large number of solar modules so as to track the movement of the sun using the fewest possible number of driver motors. For example, some known systems include parallel rows of photovoltaic modules supported on torque tubes. The torque tubes can comprise a number of long shafts connected together in an end to end fashion. The torque tubes are supported in an orientation parallel to each other such that their pivot axes are parallel. These shafts are sufficiently long that they must be supported by many vertical columns, known as "piles".

In some systems, solar energy collection devices, such as photovoltaic modules, are mounted to the shafts with support mounts. In some designs, the mounts are made to be as small as possible, while allowing for clearance for certain other components.

BRIEF SUMMARY

An aspect of at least one of the inventions disclosed herein includes the realization that connectors for transmitting torque from one sun-tracking shaft to another can be integrated with support mounts in such a way as to reduce gaps between solar collection devices, thereby increasing the amount of energy collected from the footprint of the associated solar collection system. For example, in some known systems, the photovoltaic module mounts located near coupling flanges, which are designed to transmit torque from one shaft (also known as "torque tube") to the next sequential torque tube, can present challenges during the manufacturing process. One such challenge is associated with the process for fixing the torque transmission member, also known as a "coupling flange", and the photovoltaic mounts, also known as "saddle mounts".

More particularly, in order to achieve a high level of accuracy in the positioning of the saddle mounts and coupling flanges, the torque tubes of some systems can be supported on a jig. The jig can be designed to hold the coupling flanges and saddle mounts at desired locations and orientations so that each of those separate members can be fixed to the body of the torque tube with high precision. Thus, all of the components including the body of the torque tube, the saddle mounts, and the coupling flanges are held in their desired final location and orientation during the welding process.

In order to allow for sufficient clearance for welding the coupling flange to the end of a torque tube, the closest saddle mount must be spaced from the coupling flange so that the welding tools can reach the juxtaposed surfaces of the coupling flange and the torque tube body to form the desired weld.

Photovoltaic modules typically include one or more photovoltaic cells encased in framing arrangements, which includes a structural peripheral frame. The saddle mounts are designed to support each photovoltaic module at a point along the peripheral frame. Thus, by spacing the saddle mount away from the coupling flange, the resulting solar collection system includes gaps between solar panels that are on either side of mating coupling flanges.

An aspect of at least one of the inventions disclosed herein includes the realization that the gap noted above can be reduced or eliminated by incorporating a photovoltaic module mount with a torque tube coupling flange. With the photovoltaic module mount integrated with the coupling flange as such, the appropriate attachment devices, such as welding equipment, can be used to weld the coupling flange to the torque tube body without interference from the co-located photovoltaic module mount.

Thus, in accordance with an embodiment, a torque tube for sun tracking solar collector can include a torque tube body extending along a longitudinal axis and comprising at least a first end. At least first and second support members can be fixed to the torque tube body at first and second spaced apart locations, each of the support members being configured to support at least a portion of a solar energy collector device. Additionally, at least a first torque transmission member can be fixed to the first end of the torque tube body and configured to receive and transmit a torque from the torque tube body, the first torque transmission member comprising a third support member configured to support at least a portion of a solar energy collection device.

In accordance with another embodiment, a sun tracking solar collector array can include at least first and second torque tubes aligned along a longitudinal axis and supported so as to be pivotable through a pivot range, each torque tube comprising at least a first end. A sun tracker drive can be connected to the first torque tube so as to apply a torque to the first torque tube and to drive the first torque tube through a pivot range of movements. First and second pluralities of solar collector supports can be fixed to the first and second torque tubes, respectively. First and second pluralities of solar collector devices can be supported by the first and second pluralities of solar collector supports, respectively. Additionally, at least first and second torque transmission members can be fixed to the first ends of the first and second torque tubes, respectively, wherein the first and second pluralities of solar collector supports comprise the first and second torque tube transmission members, respectively.

In accordance with yet another embodiment, a method of making a sun tracking solar collector can comprise attaching a plurality of solar collector device support members to a first torque tube body and attaching at least a first integrated solar collector device support and torque transmission member to the first torque tube body.

BRIEF DESCRIPTION OF THE DRAWINGS

FIG. 6 is a perspective view of an end of a torque tube and a coupling flange in accordance with an embodiment, attached to the end of the torque tube.

FIG. 7 is a side elevational view of the coupling flange removed from the torque tube.

FIG. 8 is an end view of the coupling flange of FIG. 7.

FIG. 9 is a side elevational view of two torque tubes connected together with two of the coupling flanges illustrated in FIG. 8 and supporting two photovoltaic modules thereabove.

DETAILED DESCRIPTION

Figure 1:
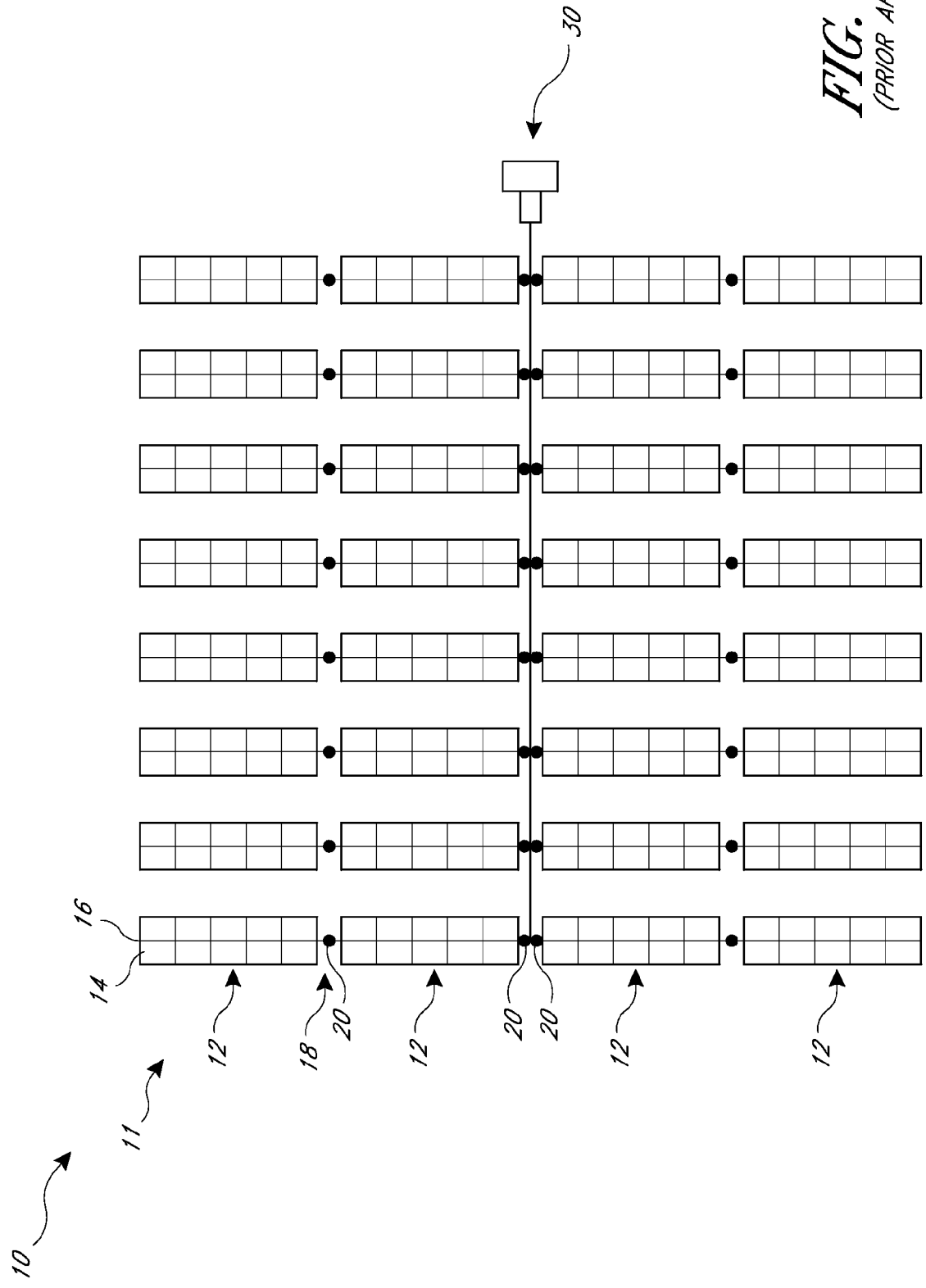
FIG. 1 is a schematic diagram of a prior art sun tracking photovoltaic system, with which the present inventions can be used.

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the proceeding technical field, background, brief summary, or the following detailed description.

Certain terminology may be used in the following description for the purpose of reference only, and thus are not intended to be limiting. For example, terms such as "upper", "lower", "above", and "below" refer to directions in the drawings to which reference is made. Terms such as "front", "back", "rear", and "side" describe the orientation and/or location of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second", and other such numerical terms referring to structures do not imply a sequence or order unless clearly indicated by the context.

The inventions disclosed herein are described in the context of non-concentrated and concentrated photovoltaic arrays and modules. However, these inventions can be used in other contexts as well, such as connectors for space frames, other kinds of rotatable shafts, and other types of sun-tracking systems such as concentrated thermal solar systems, etc.

In the description set forth below, an example of a prior art a solar energy collection system 10 is described in the context of being formed by a plurality of solar collection modules, supported so as to be pivotally adjustable for sun-tracking purposes. The inventions described below including embodiments of an integrated solar collector device support and torque transmission member, with reference to FIGS. 6-9, can be used with the solar collection system 10 described in FIGS. 1-5, as well as the variations and equivalents thereof.

FIG. 1 illustrates the solar collection system 10, which can be considered an electricity farm. The solar collection system 10 includes a solar collector array 11 which includes a plurality of solar collection modules 12. Each of the solar collection modules 12 can include one or a plurality of solar collecting devices 14 supported by a drive shaft or torque tube 16. Each of the torque tubes 16 are supported above the ground by a support assembly 18. Each of the support assemblies 18 can include a pile and a bearing assembly 20.

With continued reference to FIG. 1, the system 10 can also include a tracking drive 30 connected to the torque tube 16 and configured to pivot the torque tube 16 so as to cause the collector devices 14 to track the movement of the sun. In the illustrated embodiment, the torque tubes 16 are arranged generally horizontally and the modules 12 are connected to each other, as more fully described in U.S. patent application Ser. No. 13/176,276, filed Jul. 5, 2011, the entire contents of which is hereby expressly incorporated by reference. However, inventions disclosed herein can be used in the context of other types of arrangements. For example, the system 10 can include a plurality of modules 12 that are arranged such that the torque tube 16 is inclined relative to horizontal, wherein the torque tubes 16 are not connected in an end to end fashion, such as the arrangement illustrated and disclosed in U.S. Patent Publication No. 2008/0245360. The entire contents of the 2008/0245360 patent publication is hereby expressly incorporated by reference. Further, the inventions disclosed herein can be used in conjunction with the systems that provide for controlled tilting about two axes, although not illustrated herein.

The solar collection devices 14 can be in the form of photovoltaic panels, thermal solar collection devices, concentrated photovoltaic devices, or concentrated thermal solar collection devices. In the illustrated embodiment, the solar collection devices 14 are in the form of non-concentrated, photovoltaic modules. The photovoltaic modules can include one or more photovoltaic cells, encased in a frame assembly including an optically transparent upper cover and a peripheral frame. The design and structure of such photovoltaic modules are well known in the art are thus are not described in further detail.

Figure 2:
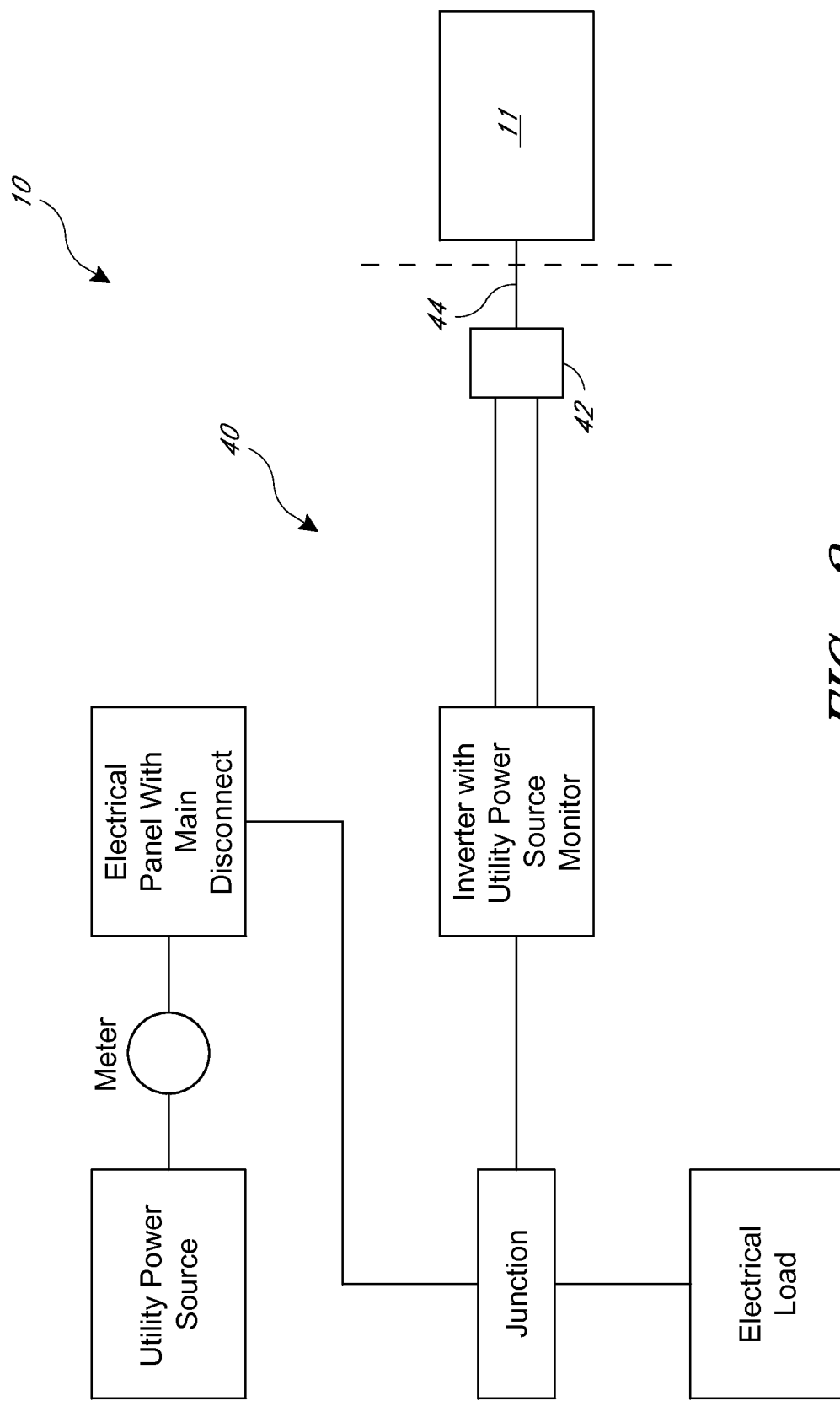
FIG. 2 is a schematic diagram of an electrical system for the photovoltaic system of FIG. 1.

With reference to FIG. 2, solar collection system 10 can further include an electrical system 40 connected to the array 11. For example, the electrical system 40 can include the array 11 as a power source connected to a remote connection device 42 with power lines 44. The electrical system 40 can also include a utility power source, a meter, an electrical panel with a main disconnect, a junction, electrical loads, and/or an inverter with the utility power source monitor. The electrical system 40 can be configured and can operate in accordance with the descriptions set forth in U.S. Patent Publication No. 2010/0071744, the entire contents of which is hereby expressly incorporated by reference.

Figure 3:
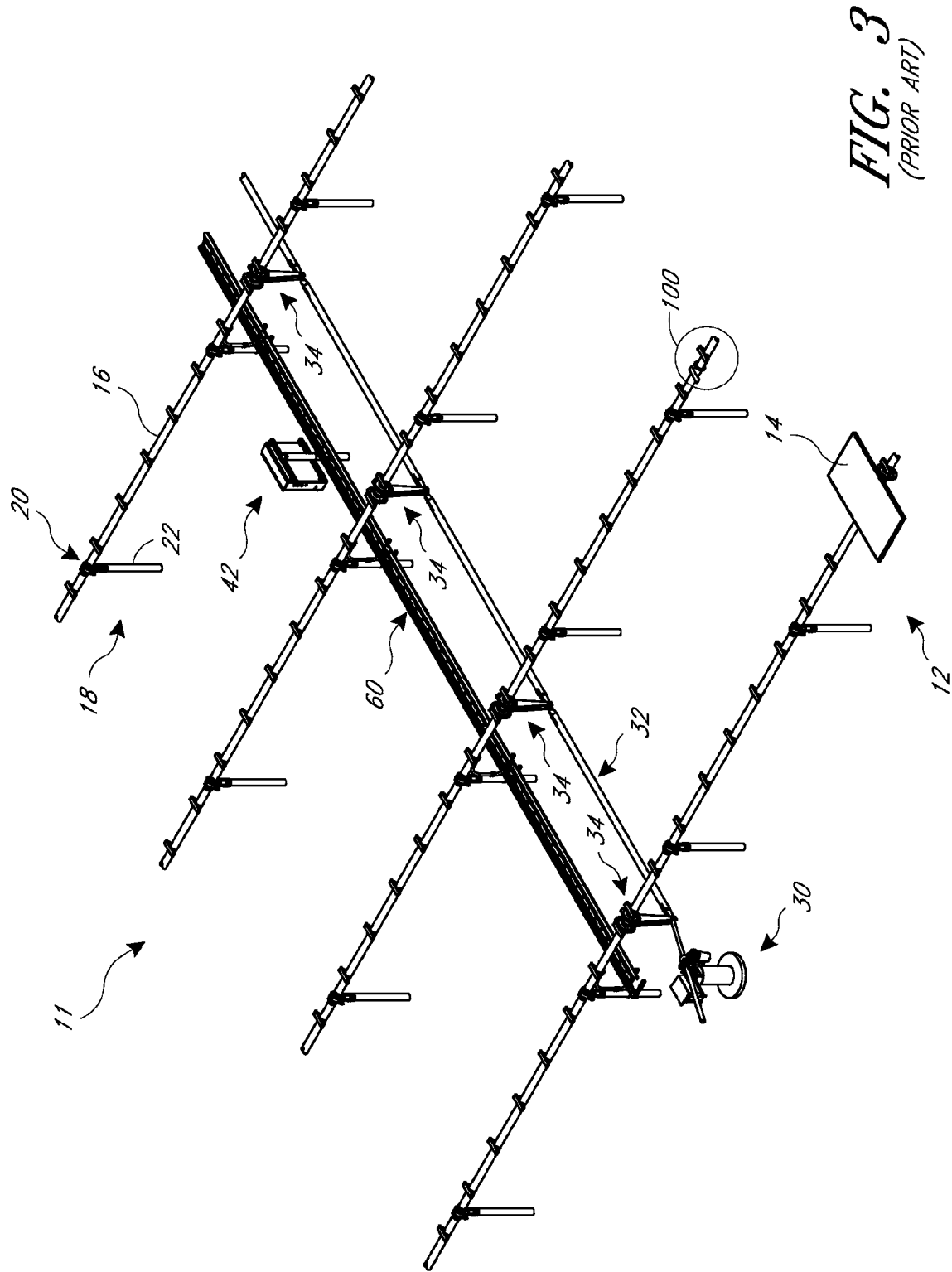
FIG. 3 is a perspective view of the solar collection system of FIG. 1, illustrating a plurality of piles mounted to the ground and supporting a plurality of torque tubes with a sun-tracking drive in accordance with an embodiment.

FIG. 3 illustrates the array 11 with all but one of the solar collection devices 14 removed. As shown in FIG. 3, each of the support assemblies 18 includes the bearing 20 supported at the upper end of a pile 22. The torque tube 16 can be of any length and can be formed in one or more pieces. The spacing of the piles 22 relative to one another, can be determined based on the desired limits on deflection of the torque tubes 16 between the support structures 18, wind loads, and other factors.

The tilt drive 30 can include a drive strut 32 coupled with the torque tube 16 in a way that pivots the torque tube 16 as the drive strut 32 is moved axially along its length. The drive strut 32 can be connected with the torque tube 16 with torque arm assemblies 34. In the illustrated embodiment, the torque arm assemblies 34 disposed at an end of each of the torque tube 16.

Additionally, the array 11 can include an electrical wire tray 60 supported by one or more of the piles 22, or by other means. The tray 60 can be used to support any of the wires that may be used for the operation of the system 10. For example, although not illustrated in FIG. 3, each of the solar collection devices 14 includes a power output device (not shown). Such power output devices can be in the form of direct current (DC), electrodes, or alternating current (AC) electrodes. Photovoltaic devices are typically designed to output a direct current. However, the modules 12 can include dedicated inverters (not shown) such that each module 12 outputs an alternating current. Further, a selected subset of the modules 12 can include inverters, combining the direct current of several modules 12 with one inverter. The outputs from each of these inverters can then be combined.

Thus, whether or not the modules 12 output DC or AC current, the modules 12 each have one or more wires extending from the module, to adjacent modules 12, and eventually to the tray 60, then eventually to the remote connection device 42, or other electrical equipment. The tray 60 is typically mounted above the ground at a distance of about 9-12 inches.

With reference to FIG. 3, a connection arrangement is identified by the reference numeral 100.

Figure 5:
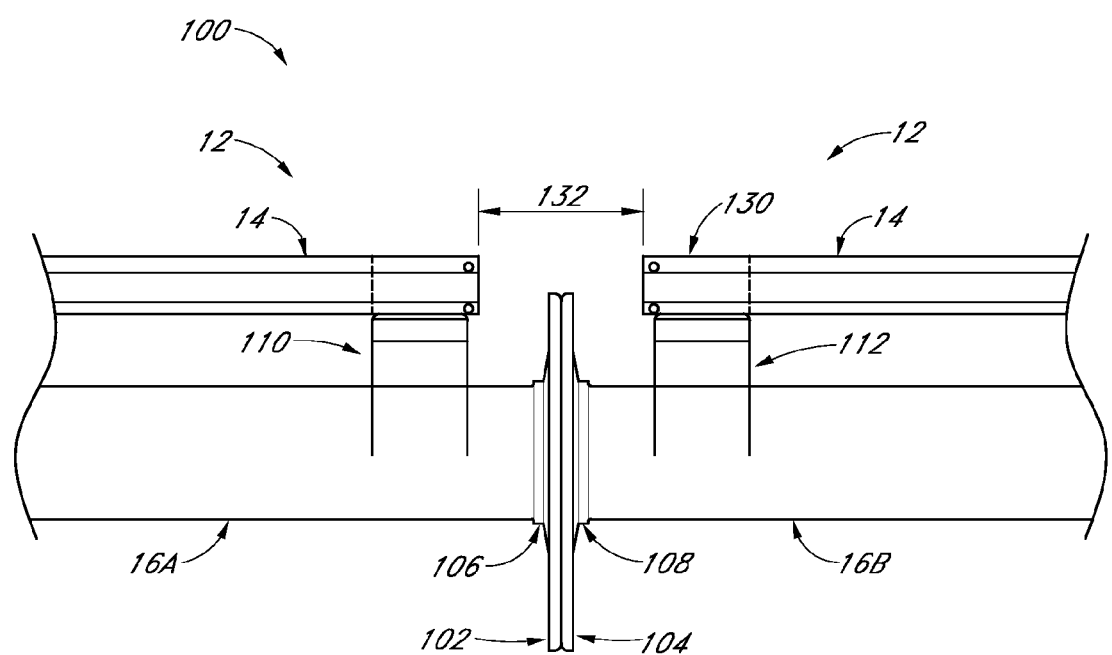
FIG. 5 is a side elevational view of the torque tube illustrated in FIG. 4 connected to another torque tube and with photovoltaic modules supported on either side of the coupling flanges of the two torque tubes.

FIG. 5 is an enlarged side elevational view of the connection arrangement 100, and illustrates the spacing between two photovoltaic modules that are supported by the connection arrangement 100.

Figure 4:
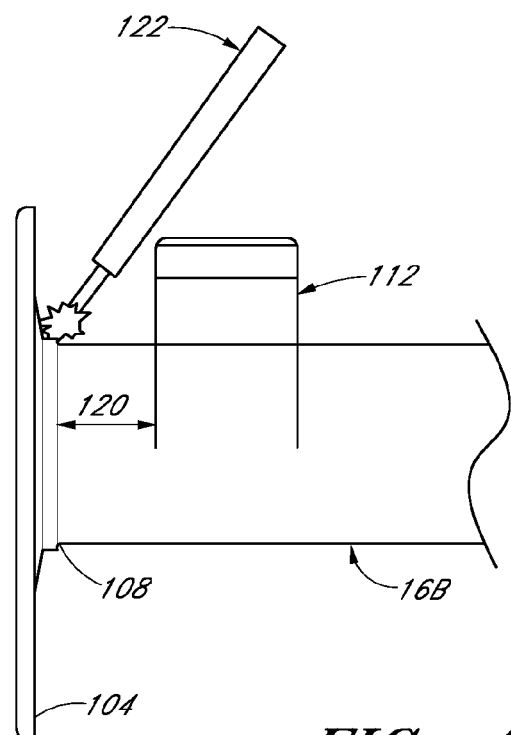
FIG. 4 is an enlarged side elevational view of one end of a torque tube and a welding tool creating a weld between the torque tube body and a coupling flange, with a saddle mount spaced apart from the coupling flange.

With continued reference to FIGS. 4 and 5, a torque tube 16A disposed on the left side of FIG. 5 is connected to a torque tube 16B disposed on the rights side of FIG. 5. Each of the torque tubes include a coupling flange 102, 104. Each of the coupling flanges 102, 104 are welded to their respective torque tubes 16A, 16B along a weld line 106, 108. Additionally, the coupling flanges 102, 104 are connected to each other by fasteners, such as for example, bolts and nuts (not shown) extending through bolt holes of the flanges 102, 104.

Each of the torque tubes 16A, 16B also include a plurality of saddle mounts. FIG. 3 illustrates a large number of saddle mounts extending along the lengths of the torque tubes 16 illustrated therein. FIG. 5, on the other hand, illustrates the saddle mounts 110, 112 that are the closest to the coupling flanges 102, 104. The saddle mounts 110, 112 are spaced apart from their respective coupling flanges 102, 104, to facilitate certain manufacturing processes.

For example, as shown in FIG. 4, the saddle mount 112 is spaced from the coupling flange 104 by a distance 120. This distance allows a welding tool 122 to be inserted between the saddle mount 112 and the coupling flange 104 at the appropriate angle, for example, between 30 and 60 degrees, so as to form the desired weld 108 between the body of the torque tube 16B and the coupling flange 104.

In some methods for manufacturing a torque tube, such as the torque tube 16B, the body of the torque tube 16B is supported in a precision jig (not shown). A plurality or all of the saddle mounts 112 and coupling flanges 104 are also held by the jig in a precise orientation and location relative to the body of the torque tube 16B. With all these components held in the desired final location as such, welding tools, such as the welding tool 122, can be used to fix all of the saddle mounts 112 and coupling flanges 104 in place. Thus, the gap 120, in some methods of manufacturing, is required so that the appropriate weld 108 can be applied between the coupling flange 104 and the body of the torque tube 16B.

As is well known in the art, some types of photovoltaic modules 12, such as that illustrated in FIG. 5, include a photovoltaic device 14, optionally encased under glass (not shown) and structurally stiffened with a peripheral frame 130. The shape, material, and general construction of such a frame is well known in the art. With this type of design, the photovoltaic module 12 can only be structurally supported along its periphery. Thus, the position of the saddle mounts 112 determine the location of the terminal edges of modules 14 that are disposed on either side of the connection assembly 100. Thus, the gap 120 (FIG. 4) controls the size of the overall gap 132 between the photovoltaic modules 114 on either side of the connection assembly 100.

With reference to FIGS. 6-9, an embodiment of the present integrated coupling flange and solar device mount is illustrated therein and identified by the reference numeral 200. In some embodiments, the coupling flange can include a mating face portion 202 and a solar device support portion 204.

The face mating portion 202 can include a flange portion 206 extending peripherally around the central portion 208 which can be roughly equivalent to an outer diameter of the torque tube 16A. Additionally, the flange portion 206 can include a pattern of bolt holes for facilitating the use of fasteners such as bolts for connection juxtaposed flanges to each other. In some embodiments, the central portion 208 is a hole, and the inner diameter of the hole 208 can be slightly larger than the outer diameter of the torque tube 16A. For example, the inner diameter of the hole 208 can be sufficiently large so as to provide the desired clearance, if any, for accommodating a weld between the flange 200 and the body of the torque tube 16A.

The flange portion 206 can be made in accordance with the same structure of the couplings 102, 104 (FIG. 5), which are based on the overall size of the torque tubes connected thereto and other design considerations, as is well known in the art.

The mounting portion 204 can include at least one support surface 220 configured to provide support for a device such as a solar power collection device, which may be in the form of, for an example, but without limitation, a photovoltaic solar module, a concentrated photovoltaic collector, a concentrated reflector, such as a curved mirror, or other types of devices. Thus, in embodiments where the support surface 220 is configured to support a photovoltaic collector, the upper support surface 220 could be in the form of the same or similar upper surface of a saddle mount 112. Additionally, the support portion 204 can be sized so as to maintain the support surface 220 at the same height as an upper surface of a saddle mount 112 which can be attached to the torque tube 16A. For illustrative purposes, FIG. 9 includes a schematic representation of a saddle mount 110.

In some embodiments, the support portion 204 can be in the form of a cantilever structure, with one edge directly supported by the flange portion 206, the other end being a free end. In the illustrated embodiment of FIGS. 6-9, the support portion 204 includes a truss configuration. In this embodiment, the support surfaces form to the first member 222 extending generally perpendicular relative to the flange portion 206. The distal end of the member 222 is connected with a truss member 224 that connects the distal end of the support portion 222 to the flange portion 206. Optionally, an additional stiffening member 226 can be mounted generally parallel to the flange portion 206 to provide additional stiffening for the support portion 204. In some embodiments, the flange portion 206, and members 222, 224 and 226 can be formed from a single piece of sheet metal, stamped or otherwise cold worked into the shape illustrated in FIGS. 6-9. Optionally, the members the flange portion 206, and members 222, 224 and 226 can be made from separate pieces of metal welded together. Other configurations can also be used.

In some embodiments, as illustrated in FIGS. 6 and 8, the support surface 220 can be divided. For example, as shown in FIGS. 6 and 8, the support portion 204 can include a recess 230. Optionally, the flange portion 206 can also include a recess 232. In some embodiments, the recessed 230 can be disposed on an opposite side of the coupling flange 200 from the recessed 232. However, other configurations can also be used.

The recesses 230, 232 can be configured to help prevent rolling of the torque tube 16 when the torque tube 16 is placed on a flat surface. Further, the recesses 230, 232 can be used to allow a plurality of the torque tubes 16 to be stacked one upon another. For example, during shipping or storage of a plurality of torque tubes 16, the torque tubes could be stacked one upon another, such that portions of the body of the torque tube 16 lie in the recesses 230, 232. For illustrative purposes, portions of adjacently stacked torque tube 16 are illustrated in FIG. 8, in phantom line. In such a stacked configuration, the torque tubes can be longitudinally staggered such that the coupling flanges 200 nest side by side relative to torque tube 16 that are stacked one on top of another.

With such a configuration, in contrast to this design illustrated at FIG. 4, the coupling flange illustrated in FIGS. 6-9 can be attached to a torque tube, during the manufacturing process, with a welding tool such as the welding tool 122 so as to provide a weld 108 between the coupling flange 200 and end of the torque tube 16A. Further, once welded in place, the gap 120 formed in the design of FIG. 4 is not formed with the coupling flange 200. Rather, the support surface 220 can be disposed adjacent a terminal end of a torque tube 16A. Thus, in this design, a complete torque tube 16 can be completed with less welding because it is unnecessary to weld a separate saddle mount adjacent to a coupling flange at a terminal end of a torque tube 16. Instead, both the coupling flange and a support portion 204 can be simultaneously mounted to a terminal end of a torque tube 16 with only the welds required to attach the inner surface of the central portion 208 to the terminal end of the torque tube 16.

Further, the coupling flange 200 can provide further benefit in the ability to mount solar modules 12 closer to one another in the vicinity of the coupling flanges. For example, as shown in FIG. 9, two torque tubes 16A, 16B are attached to one another using two coupling flanges 200, identified as 200A, 200B in FIG. 9. Photovoltaic modules 12 can be mounted immediately adjacent one another, thereby reducing or eliminating the gap 132 (FIG. 5) that results using the designs illustrated in FIGS. 4 and 5.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A sun-tracking solar collector system comprising:
   first and second solar energy collector devices;
   a first torque tube body extending along a longitudinal axis and comprising at least a first end;
   a second torque tube body extending along a longitudinal axis and comprising at least a second end;
   at least a first support member fixed to the first torque tube body at a first location spaced from the first end;
   at least a second support member fixed to the second torque tube at a second location spaced from the second end;
   a first torque transmission member fixed to the first end of the first torque tube body and configured to receive and transmit a torque to the first torque tube body, the first torque transmission member comprising a third support member, the first and third support members connected to and supporting the first solar energy collection device; and
   a second torque transmission member fixed to the second end of the second torque tube body, the second torque transmission member coupled to the first torque transmission member and configured to receive and transmit the torque to the second torque tube body, the second torque transmission member comprising a fourth support member, the second and fourth support members connected to and supporting the second solar energy collection device.

2. The system according to claim 1, wherein each of the first, second, third, and fourth support members comprise an upper support surface configured to support the corresponding one of the first and second solar collector devices.

3. The system according to claim 2, wherein all of the upper support surfaces of the plurality of support members are aligned along a plane.

4. The system according to claim 2, wherein each of the upper support surfaces comprises first and second lateral surfaces spaced from each other and disposed on opposite sides of the longitudinal axis of the torque tube body.

5. The system according to claim 1, wherein the first torque transmission member comprises a flange with a plurality of fastener receiving holes disposed around the flange and extending parallel to the longitudinal axis of the first torque tube body.

6. The system according to claim 1, wherein the first torque transmission member and the third support member are formed in a single monolithic member.

7. The system according to claim 1, wherein the first torque transmission member and the third support member are directly welded to each other.

8. The system according to claim 1, wherein the first torque transmission member directly supports at least a portion of the third support member.

9. The system according to claim 1, wherein the first and second solar energy collector devices are mounted immediately adjacent one another.

10. A sun-tracking solar collector array, comprising:
    at least first and second torque tubes aligned along a longitudinal axis and supported so as to pivotable through a pivot range, each torque tube comprising at least a first end;
    a sun-tracker drive connected to the first torque tube so as to apply a torque to the first torque tube and to drive the first torque tube through a pivot range of movement;
    first and second pluralities of solar collector supports fixed to the first and second torque tubes, respectively;
    first and second pluralities of solar collector devices supported by the first and second pluralities of solar collector supports, respectively;
    at least first and second torque transmission members fixed to the first ends of the first and second torque tubes, respectively, the first and second torque transmission members coupled to one another to transmit the torque from the first torque tube to the second torque tube, and wherein the first and second pluralities of solar collector supports comprise the first and second torque transmission members, respectively, such that at least a portion of the first plurality of solar collector devices are connected to and supported by the first torque transmission member and at least a portion of the second plurality of solar collector devices are connected to and supported by the second torque transmission member.

11. The sun-tracking solar collector array according to claim 10 additionally comprising a torque arm interposed between and connected to the first and second torque transmission members, the torque arm being connected to the sun-tracking drive so as to transmit torque from the sun-tracking drive to the first and second torque transmission members.

12. The sun-tracking solar collector array according to claim 10, wherein the first torque transmission member is integrated with a first of the first plurality of solar collector supports.

13. The sun-tracking solar collector array according to claim 12, wherein the first torque transmission member and the first of the first plurality of solar collector supports is a single monolithic member.

14. The sun-tracking solar collector array according to claim 10, wherein support surfaces of each of the first and second pluralities of solar collector supports are aligned along a plane.

15. The sun-tracking solar collector array according to claim 10, wherein adjacent solar collector devices of the first and second pluralities of solar collector devices are mounted immediately adjacent one another.

16. A method of making a sun-tracking solar collector, comprising:
    attaching a first plurality of solar collector device support members to a first torque tube body;
    attaching a second plurality of solar collector device support members to a second torque tube body;
    attaching at least a first integrated solar collector device support and torque transmission member to the first torque tube body;
    attaching at least a second integrated solar collector device support and torque transmission member to the second torque tube body;
    coupling the first integrated solar collector device support and torque transmission member to the second integrated solar collector device support and torque transmission member;
    attaching at least a portion of a first solar collector device to the first integrated solar collector device support and torque transmission member; and
    attaching at least a portion of a second solar collector device to the second integrated solar collector device support and torque transmission member.

17. The method according to claim 16 additionally comprising attaching a plurality of solar collector devices including the first solar collector device to the first plurality of solar collector device support members and to the first integrated solar collector device support and torque transmission member.

18. The method according to claim 16 additionally comprising supporting the torque tube body with a bearing at a position spaced above a ground surface.

19. The method according to claim 16 additionally comprising aligning support surfaces of the plurality of solar collector device support members and a support surface of the integrated solar collector device support and torque transmission member along a plane.

20. The method according to claim 16, additionally comprising mounting the first solar collector device to the first integrated solar collector device support and torque transmission member and mounting the second solar collector device to the second integrated solar collector device support and torque transmission member so as to minimize spacing between the first and second solar collector devices.

* * * * *